United States Patent [19]

Tamaru

[11] Patent Number: 4,570,256
[45] Date of Patent: Feb. 11, 1986

[54] DISC CENTERING DEVICE FOR USE IN A DISC PLAYER

[75] Inventor: Takuya Tamaru, Hamamatsu, Japan
[73] Assignee: Nippon Gakki Seizo Kabushiki Kaisha, Hamamatsu, Japan
[21] Appl. No.: 665,931
[22] Filed: Oct. 29, 1984

[30] Foreign Application Priority Data

Oct. 31, 1983 [JP] Japan .................. 58-168534[U]

[51] Int. Cl.⁴ ............................................. G11B 17/04
[52] U.S. Cl. ....................................................... 369/271
[58] Field of Search .............................. 369/270, 271

[56] References Cited

U.S. PATENT DOCUMENTS

| | | | |
|---|---|---|---|
| 3,815,146 | 6/1974 | Nash | 369/270 |
| 3,972,535 | 8/1976 | Bleiman | 369/270 |
| 4,495,613 | 1/1985 | Gagnon | 369/270 |
| 4,499,573 | 2/1985 | Morinaga | 369/270 |

FOREIGN PATENT DOCUMENTS

| | | | |
|---|---|---|---|
| 153284 | 9/1983 | Japan | 369/270 |
| 818914 | 8/1959 | United Kingdom | 369/270 |

*Primary Examiner*—Steven L. Stephan
*Attorney, Agent, or Firm*—Spensley Horn Jubas & Lubitz

[57] ABSTRACT

A disc centering device for centering an information carrier disc having a central aperture in a disc player. A turntable has a cylindrical wall provided at the center portion thereof to guide the information carrier disc to fit therearound. A disc rest portion is formed around the cylindrical wall and supports the information carrier disc. A clamping mechanism is provided for clamping the information carrier disc in cooperation with the disc rest portion of the turntable, the clamping mechanism being movable against the turntable, and the information carrier disc is clamped between the clamping mechanism and the disc rest portion. A centering mechanism is provided for centering the information carrier disc with respect to the turntable by contacting the periphery of the central aperture of the information carrier disc when the information carrier disc is clamped by the clamping mechanism. The centering mechanism has a support arm radially extending in a cantilever fashion from the turntable, the free end of the support arm being located in the vicinity of the cylindrical wall. The support arm is deflectable in a resilient manner when the force is exerted on the free end thereof by the clamping mechanism.

12 Claims, 11 Drawing Figures

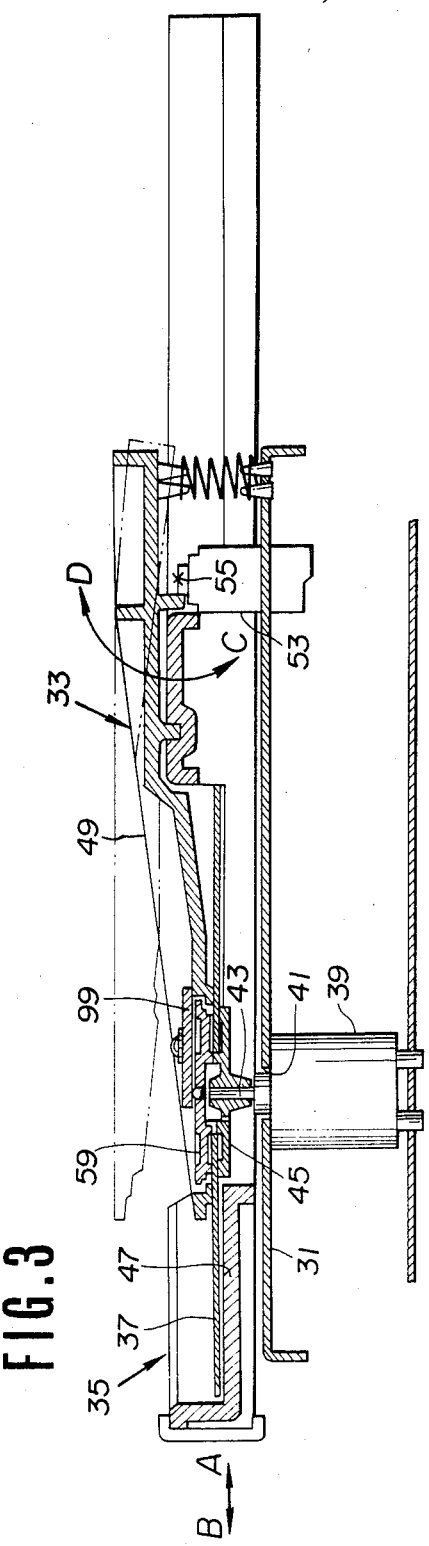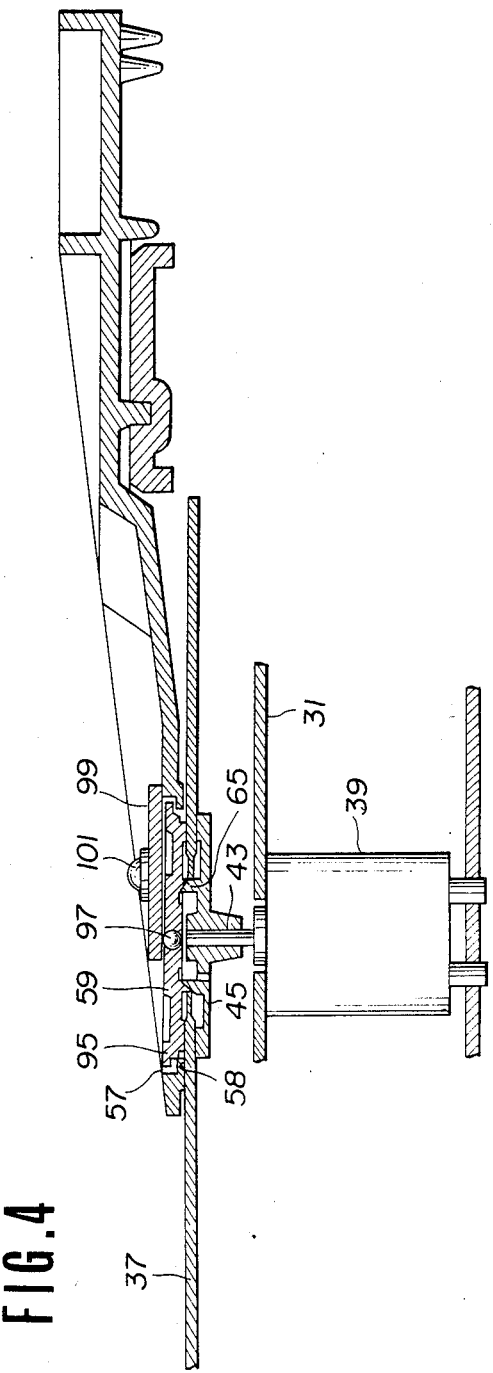

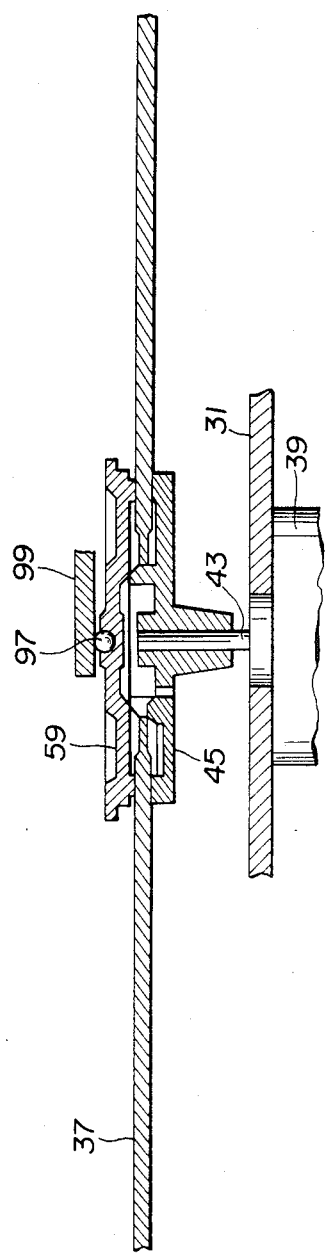

DISC CENTERING DEVICE FOR USE IN A DISC PLAYER

BACKGROUND OF THE INVENTION

1. Field of the Invention

The present invention relates to a disc centering device for centering an information carrier disc, such as a compact disc of the compact disc digital audio system as a digital audio disc, a video disc or the like which is to be placed on a turntable of a disc player such as a digital audio disc player and a video disc player.

2. Description of the Prior Art

In the disc player of the above-mentioned type, it is, as well known, necessary to center the information carrier disc on the turntable as accurate as possible in order to exactly catch signals recorded in the disc by means of a reproducing head.

For this purpose there has been proposed, for example, a disc clamping device for use in a compact disc player of the compact disc digital audo system, shown in FIG. 1, in which a turntable 1 is fixedly attached at its boss 2 around a rotation shaft 3 of a drive motor 4 which is fastened to a chassis 5. The turntable 1 is provided at the upper side thereof with a center spindle 6 of an annular wall shape projecting upwards coaxially with the boss 2 and having a diameter d slightly smaller than the outer diameter of the central aperture of a compact disc 9 and at the outer periphery of the upper side thereof with an annular disc supporting rib 7. The compact disc 9 is placed on the disc supporting rib 7 with the central aperture thereof fitted around the center spindle 6 having a guide taper surface 10 formed at its upper end. Then, the compact disc 9 so placed is depressed by a clamping plate 11, which is urged toward the turntable 1 by a downward force applied on the plate 11, and the disc 9 is thereby clamped between the clamping plate 11 and the disc supporting ridge 7 to achieve the attachment of the compact disc to the turntable 1.

In the above-described disc clamping device, a horizontal clearance between the center spindle 6 and the periphery of the central aperture of the disc 9 exists since the diameter of the central aperture is larger than the outer diameter of the center spindle 6 and hence the centering of the compact disc 9 is not accurately made. More specifically, the diameter D of the central aperture of the compact disc should be from 15−0 mm to 15+0.1 mm. On the other hand, the center spindle 6 is normally manufactured to have an outer diameter d of 14.90 to 14.95 mm in view of smooth fitting and removal of the compact disc with respect to the center spindle 6. Thus, the clearance $D-d=0.2 \sim 0.05$ mm occurs between the periphery of the central aperture of the disc 9 and the outer wall of the center spindle 6 and the compact disc 9 is hence set to the turntable 1 with a misalignment of 100μ to 25μ. In the compact disc player, even such a degree of misalignment can provide a disturbance to a tracking servo operation of the reproducing head.

FIG. 2 illustrates another typical example of the conventional centering device which is disclosed in U.S. Pat. No. 4,340,955. In this device, a drive motor 16 is mounted below a stationary platform 15 so that the rotation shaft 17 thereof vertically upwardly passes through an aperture formed through the platform 15. Around the rotation shaft 17 there is fixedly attached a concentric turntable 18 of a generally cylindrical cap shape having an annular flange 20, serving as a disc supporting portion, formed at its upper end. Above the turntable 18, a generally frustoconical centering member 22 is fitted around the rotation shaft 17 for vertical slide, the centering member 22 being provided at its periphery with a tapering surface 21. The centering member 22 is urged upwards by a spring 25.

To set a compact disc 26 to the turntable 18, the central aperture of the disc 26 is brought into engagement with the taper surface 21 of the centering member 22, and then a clamp member 27 is fitted around the rotation shaft 17 and is pressed downwards to thereby depress the disc 26 together with the centering member 22, thus clamping the disc 26 between the base portion of the clamp member 27 and the disc supporting portion 20 of the turntable 18. Thus, the prior art centering device shown in FIG. 2 is capable of accurately centering the disc about the axis of the rotation shaft 17 since the periphery of the central aperture of the compact disc 26 engages with the taper surface 21 of the centering member 22 in a fairly wide latitude in variation in the inner diameter of the central aperture.

However, this prior art device has a drawback in that the rather complicated structure thereof makes the assemblage thereof laborious thus raising the production cost. Further, the relative displacement of the centering member 22 relative to the turntable 18 inevitably produces a play between them, which makes it unable to carry out the centering of the disc in a high degree. In addition, when the centering member 22 does not smoothly slide along the rotation shaft 17 due to a tight engagement, the smooth centering of the disc 26 cannot be achieved.

SUMMARY OF THE INVENTION

Accordingly, it is an object of the present invention to provide a disc centering device of a disc player which accurately and smoothly centers an information carrier disc with respect to the turntable in a relatively large latitude in variation of the diameter of the central aperture of the disc.

It is another object of the present invention to provide a disc centering device which is simple in structure thus facilitating the assemblage of the device, and which is hence advantageous in the production cost.

With these and other objects in view the present invention provides a disc centering device for centering an information carrier disc having a central aperture in a disc player. The disc centering device comprises: a turntable having a cylindrical wall provided at the center portion thereof, for guiding the information carrier disc to fit therearound and a disc rest portion formed around the cylindrical wall for supporting the information carrier disc; clamping mechanism for clamping the information carrier disc in cooperation with the disc rest portion of the turntable, the clamping mechanism being movable against the turntable between a released position and a clamping position where the information carrier disc is clamped between the clamping mechanism and the disc rest portion; and a centering mechanism for centering the information carrier disc with respect to the turntable by contacting the periphery of the central aperture of the information carrier disc when the information carrier disc is clamped by the clamping mechanism; the centering mechanism having a support arm one end of which is supported by the turntable radially extending in a cantilever fashion and the other end of which is a free end and is located in the vicinity of the cylindrical wall of the turntable; the support arm being deflectable in a resilient manner when a force is exerted on the free end of the support arm by the clamping mechanism.

BRIEF DESCRIPTION OF THE DRAWINGS

In the drawings;

FIG. 3 is a vertical sectional view of a disc centering device constructed according to the present invention;

FIG. 4 is an enlarged view of a part of the disc centering device in FIG. 3;

FIG. 5 is a further enlarged view of an essential part of the disc centering device in FIG. 4;

DETAILED DESCRIPTION OF THE PREFERRED EMBODIMENT

Figure 1:
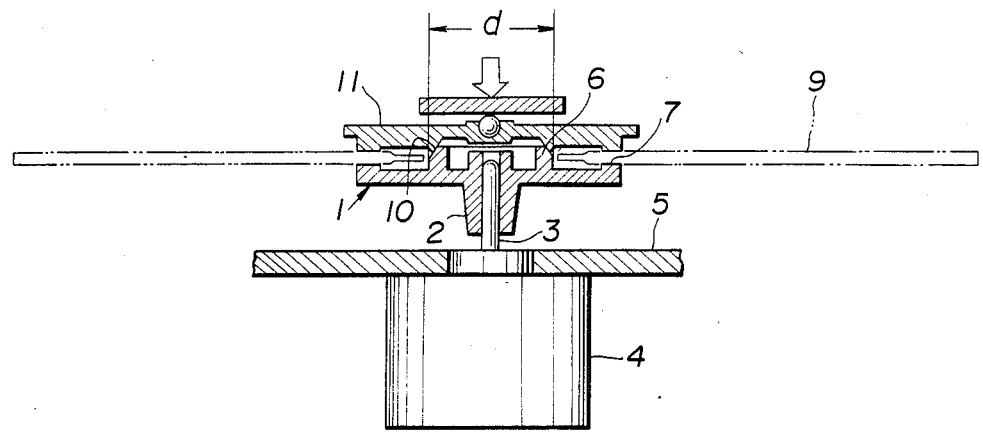
FIG. 1 is a vertical sectional view of one example of the prior art disc centering device.

With reference to FIGS. 3 to 11, one embodiment of the present invention will be described. In FIG. 3, reference numeral 31 designates a chassis of a compact disc player of the compact disc digital audio system, on which chassis a clamping assembly 33 is mounted for vertical angular movement. A tray assembly 35 for carrying an information carrier disc 37, a compact disc in this embodiment, is disposed above the chassis 31. The clamping assembly 33 and the tray assembly 35 are disclosed in copending U.S. patent application Ser. No. 658,226, entitled "DISC AUTOMATICALLY SETTING DEVICE OF A DISC PLAYER", filed on Oct. 5, 1984 in the name of Hiroyoshi Takanashi and corresponding to Japanese patent applications Nos. Sho 58-189,600 and Sho 58-189,601 and Japanese Utility Model Applications Nos. Sho 58-156,943 and 58-156944 filed on Oct. 11, 1983, of which disclosures are incorporated herein by reference.

On the lower surface of the chassis 31 there is fixedly mounted an electric motor 39 for driving the compact disc 37 so that the rotation shaft 43 thereof vertically passes through an aperture 41 formed through the chassis 31. The rotation shaft 43 has a turntable 45 fixedly attached around it. The tray assembly 35 is provided with a flat disc support portion 47. The tray assembly 35 is supported on the chassis 31 to be movable in the directions shown in FIG. 3 by the double-headed arrow AB between an open position where the disc support portion 47 is exposed to the outside of a compact disc player body (not shown) for placing and replacing a compact disc on it and a shut position where the compact disc placed on the disc support portion 47 is positioned above the turntable 45. This movement of the tray assembly 35 is automatically made by a tray drive mechanism (not shown). The tray assembly 35 is further provided with a disc lifting mechanism (not shown), which serves to lift the compact disc 37 while the disc 37 is transported or positioned in the open position and to lower the compact disc 37 so as to place the disc 37 on the turntable 45 when the disc 37 is positioned just above the turntable 45.

The clamping assembly 33 includes an elongated clamping body 49 which is supported at one end portion thereof by a supporting column 53 fixed to the chassis 31 for pivotal movement about a fulcrum 55 formed in the supporting column 53 in the vertical direction shown by the double-headed arrow CD in FIG. 3. The clamping body 49 is provided at the other end with a circular aperture 57, in which a clamping disc 59 is, as hereinafter described in detail, disposed. The wall of the aperture 57 has a circular flange 58 projecting radially inwards from it. The clamping disc 59 is to clamp the compact disc 37 on the turntable 45 when the tray assembly 35 is placed in the shut position.

Figure 6:
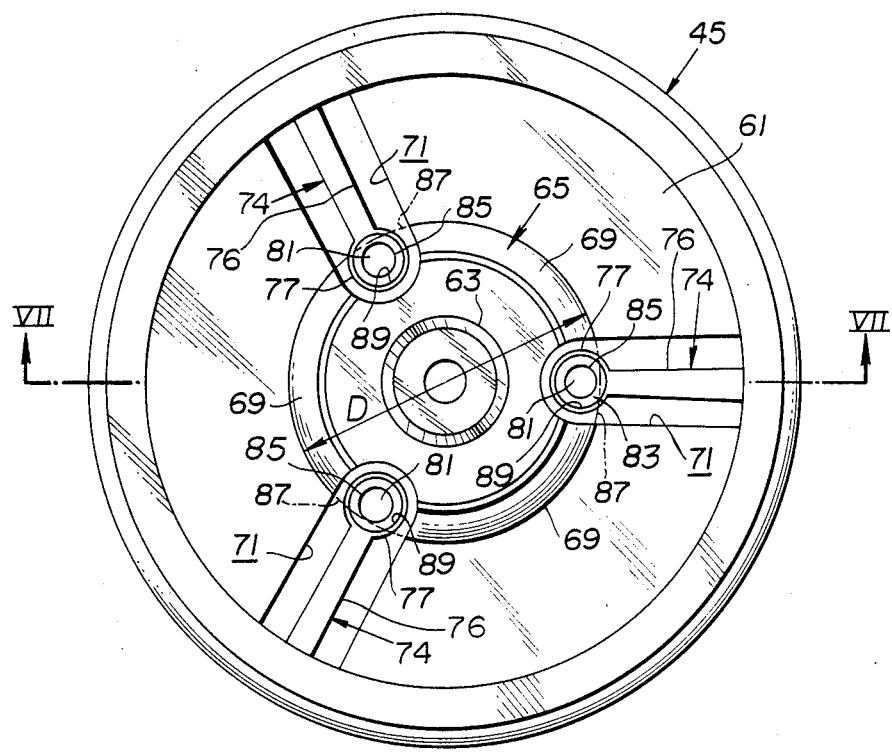
FIG. 6 is an enlarged plan view of the turntable in FIG. 3.
Figure 7:
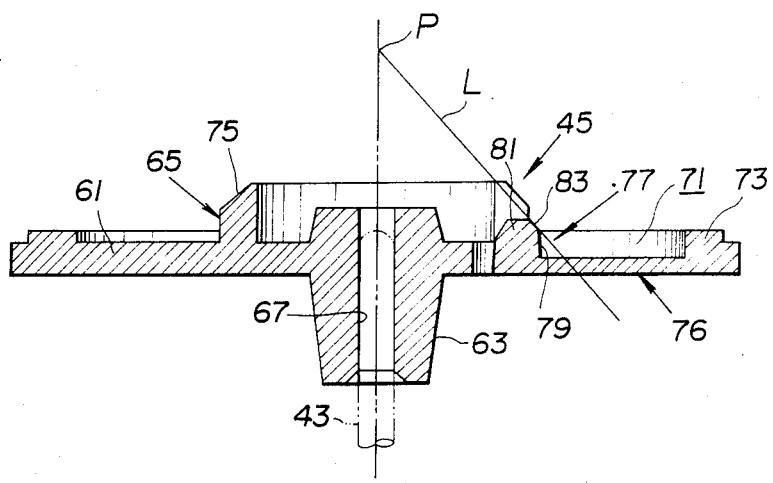
FIG. 7 is a view taken along the line VII—VII in FIG. 6.

The turntable 45 is, as shown in more detail in FIGS. 6 and 7, generally of a disc shape and is molded of a synthetic resin. The turntable 45 includes a disc portion 61, a hub 63 formed at the center of the disc portion 61 and a center spindle portion 65 integrally formed with the upper side of the disc portion 61 in the vicinity of the hub 63 to surround the latter. The hub 63 has an axial through hole 67, into which the shaft 43 of the disc motor 39 is fitted. The center spindle portion 65 is shaped in a generally annular vertical wall coaxial with the hole 67 of the hub 63, but is separated into three segments 69 by three through slots 71 formed in the disc portion 61. Each segment 69 is provided at the outer periphery of the upper end thereof with a taper surface 75 tapering upwards toward the axis of the turntable 45. The outer diameter D of the center spindle portion 65 is designed to be slightly smaller than the center aperture of the compact disc 37. The disc portion 61 is concentrically provided at its outer peripheral portion with an annular disc rest 73 projecting upwards. The three slots 71 are formed at equal angular intervals about the axis of the turntable 45 so that they extend radially inwards from the inner periphery of the disc rest 73. The inner ends of the slots 71 pass through the center spindle portion 65 to thereby form the three segments 69. The disc portion 61 is provided at its peripheral portion with three centering members 74 each having a support arm 76 radially inwardly extending from the inner wall of the disc rest 73 to be located in the slot 71 in a cantilever fashion. Each support arm 76 has a centering head 77 upwardly projecting from the free end thereof. The centering heads 77 each consist of a cylindrical base 79 slightly tapered upward and a frustoconical portion 81 concentrically and integrally formed with the base 79. The frustoconical portion 81 is disposed so that the upper periphery 85 of the taper face 83 thereof, is positioned within an imaginary circle 87, shown by the phantom line in FIG. 6, on which the outer peripheries of the center spindle segments 69 lie, and so that part of the lower periphery 89 of the taper face 83 is positioned outside the imaginary circle 87. Furthermore, the axis of each frustoconical portion 81 is disposed at a corresponding apex of an equilateral triangle which is perpendicular to the axis of the turntable 45 and concentric with it. The support arm 76 has a thickness smaller than the disc portion 61 and is resiliently deflectable so that the frustoconical portion 81 may be displaced in the vertical direction.

Figure 8:
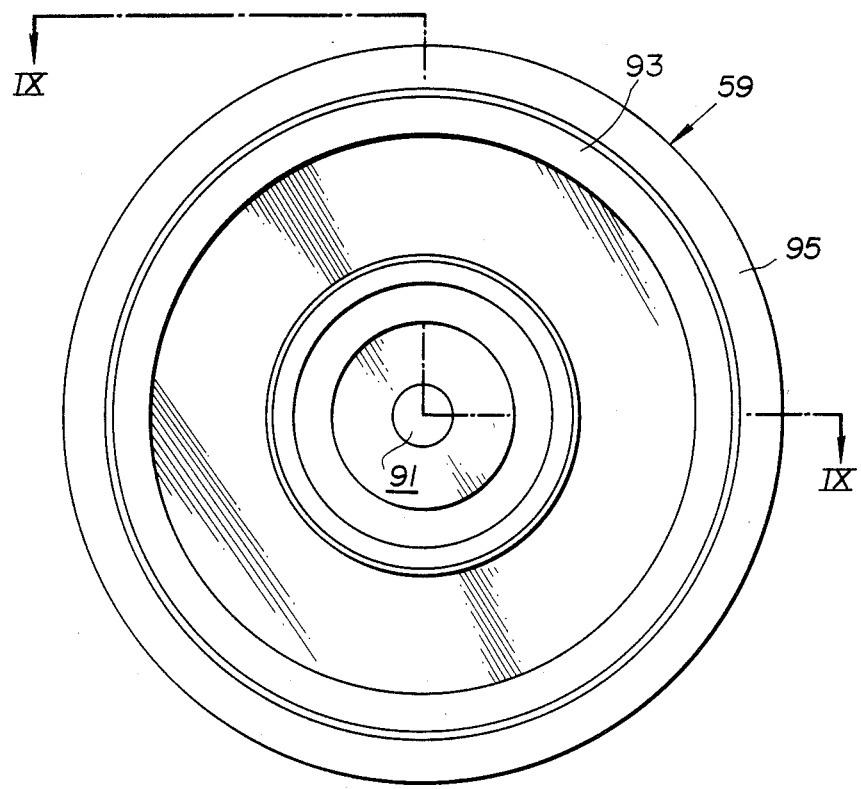
FIG. 8 is an enlarged bottom view of the clamping disc in FIG. 3.
Figure 9:
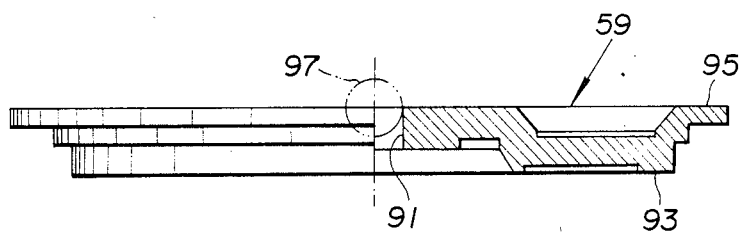
FIG. 9 is a view taken along the line IX—IX in FIG. 8.

The clamping disc 59 is, as shown in FIGS. 8 and 9, provided at its center with a central hole 91 and at the peripheral portion of the lower side thereof with a circular clamping portion 93 projecting downwards. The central hole 91 is tapered upward at its lower portion. The clamping portion 93 is adapted to clamp the compact disc 37 in cooperation with the disc rest 73 of the turntable 45. The clamping disc 59 is further provided at it peripheral portion with a circular flange 95 extending radially outwards. This clamping disc 59 is, as shown in FIG. 4, disposed within the aperture 57 with a steel ball 97 received in the central hole 91. A cover plate 99 extends over the clamping disc 59 and covers the steel ball 97 placed in the center hole 91. The cover plate 99 is fastened by a pair of machine screws 101 and 101, only one of which is shown in FIGS. 3 and 4, to the clamping body 49. The clamping disc 59 is prevented from dropping out of the aperture 57 by the engagement of the circular flange 95 with the flange 58 of the aperture 57. The clamping disc 59 is further prevented by the cover plate 99 from coming out of the aperture 57 upwards. The clamping assembly 33 is adapted to angularly move in the direction shown by the double-headed arrow CD in FIG. 3 in an interlocking relationship with the tray assembly 35. When the tray assembly 35 is in the open position or transports the compact disc 37, the clamping assembly 33 is located at an upper limit position indicated by the phantom line in FIG. 3. When the disc 37 is placed in position on the turntable 45, the clamping assembly 33 is located at a lower limit position indicated by the solid line, in which position the clamping disc 59 is rotatable about its center with the steel ball 97 being brought into contact with the cover plate 99.

To place the compact disc 37 on the tray assembly 35, the tray drive mechanism is actuated by depressing an opening button (not shown) to thereby move the tray assembly 35 in the direction B shown by the double-headed arrow to an open position (not shown) where the disc support portion 47 of the tray assembly 35 is exposed to the outside of the apparatus. In this open position, the compact disc 37 is placed within the disc support portion 47 where the disc 37 is held at an elevated position by the disc elevating mechanism. Then, the tray driving mechanism is again actuated by depressing a button for shutting the tray assembly to thereby return the tray assembly 35 in the direction A shown by the double-headed arrow to a shut position shown in FIG. 3. The disc elevating mechanism lowers the disc 37 when the tray assembly 35 comes near the shut position and then places the disc 37 on the turntable 45 when the tray assembly 35 stops at the shut position, and when the center of the disc 37 comes into alignment with the center of the turntable 45. After this, the clamping assembly 33 is pivoted in the direction C from the non-operative position shown by the phantom line to the operative position shown by the solid line where the clamping disc 59 clamps the disc 37 in cooperation with the turntable 45.

By such clamping motion of the clamping disc 59 the compact disc 37 is forced to descend with the center spindle portion 65 of the turntable 45 inserted into the central aperture thereof. In this event, the disc 37 is smoothly fitted around the center spindle 65 by the guidance of the taper face 75 of the latter even if the disc 37 is in misalignment with the center spindle portion 65. When the disc 37 further descends, the periphery of the central aperture comes into contact with the taper face 83 of each centering head 77 on a line of contact L contained in the taper face 83. Although in FIG. 7 only one contact line L is shown, the contact lines L substantially converge toward a point P on the center axis of the turntable 45 above the centering heads 77 when the disc 37 is not placed on the centering heads 77. When the disc 37 is further depressed by the clamping disc 59, it is clamped on the turntable 45 with the lower face thereof brought into contact with the annular disc rest 73 of the turntable 45, in which event the taper faces 83 of the centering heads 77 lead the disc 37 into alignment with the turntable 45.

Figure 10:
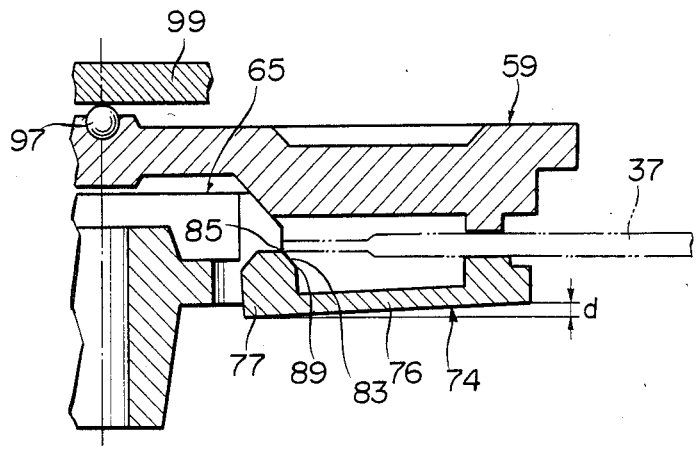
FIGS. 10 and 11 are enlarged vertical sectional views of the turntable in FIG. 3 for explaining an operation of the centering member in use.
Figure 11:
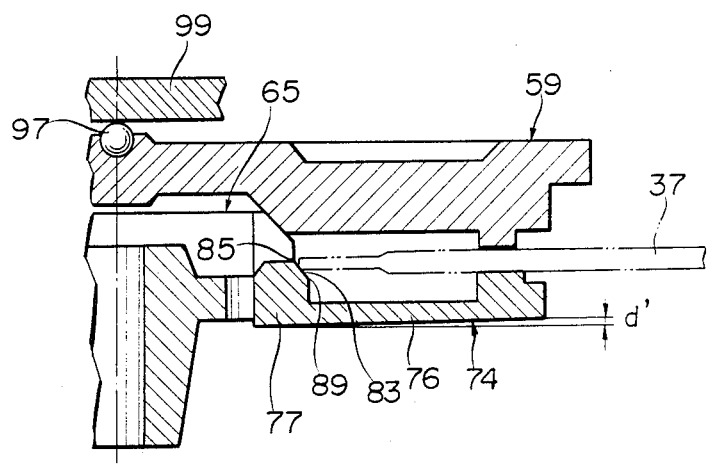

When the diameter of the central aperture of the compact disc 37 is smaller than the standard diameter, the centering of the disc 37 is made under a condition such that the taper surface 83 of the centering head 77 of each centering member 74 is depressed in the vicinity of the upper periphery 85 thereof by the inner periphery of the disc 37 with the result that the support arm 76 is, as shown in FIG. 10, resiliently deflected downwards to thereby depress the free end of each support arm 76 by a distance d from the original position. When the diameter of the central aperture of the disc 37 is larger than the standard diameter, the centering of the disc 37 is carried out under a condition such that the support arm 76 is, as shown in FIG. 11, slightly deflected by a distance d' (d'<d).

After the centering of the compact disc 37, the disc motor 39 is energized for rotating the disc 37 to reproduce the signals recorded in it by a reproduction head (not shown).

Figure 2:
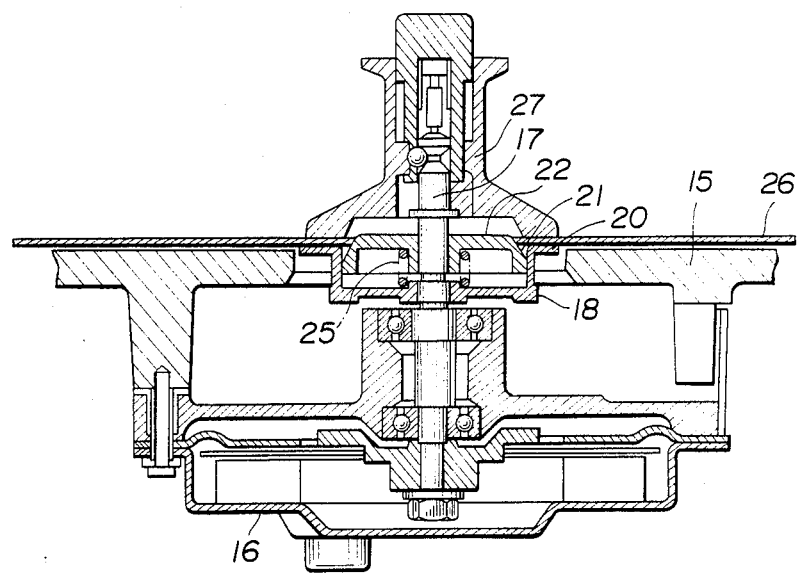
FIG. 2 is a vertical sectional view of another example of the prior art disc centering device.

In the above-described embodiment, the centering of the compact disc 37 is carried out by the taper face 83 of each centering member 74 when the disc 37 is placed on the turntable 45. In the centering operation, each taper face 83 is depressed by resiliently deflecting the support arm 76 according to the radial variation in diameter of the central aperture of the disc 37, and hence the centering member 74 is capable of reliably centering the disc 37 with respect to the turntable 45 by bringing the taper face 83 of the centering head 77 into engagement with the wall of the central aperture of the disc 37 within an allowance of the diameter of the central aperture. The centering members 74 are integrally formed with the turntable 45 and hence cannot be as a whole displaced relative to the turntable 45 as in the prior art centering device shown in FIG. 2. Thus, the centering members 74 are capable of achieving highly accurate centering.

However, the centering members and the turntable may be separately formed, in which case each support arm 76 is fastened at its proximal end to the turntable by means of a retaining screw.

While the invention has been disclosed in specific detail for purposes of clarity and complete disclosure, the appended claims are intended to include within their meaning all modifications and changes that come within the true scope of the invention.

What is claimed is:

1. A disc centering device for centering information carrier discs having a central aperture of a single nominal diameter, in a disc player, comprising:
   (a) a turntable having a cylindrical wall provided at the center portion thereof, for guiding the information carrier disc to fit therearound thereby to generally center the disc and a disc rest portion formed around the cylindrical wall for supporting the information carrier disc, said cylindrical wall having a diameter slightly less than the nomincal diameter of the aperture of the discs;
   (b) clamping means for clamping the information carrier disc in cooperation with the disc rest portion of the turntable, the clamping means being movable against the turntable between a released position and a clamping position where the information carrier disc is clamped between the clamping means and the disc rest portion; and (c) centering means for centering the information carrier disc with respect to the turntable by contacting the periphery of the central aperture of the information carrier disc when the information carrier disc is clamped by the clamping means; the centering means having at least one support arm one end of which is supported by the turntable said arm radially extending from the one end in a cantilever fashion, wherein the other end of said arm is a free end and is located in the vicinity of the cylindrical wall of the turntable; the support arm being deflectable in a resilient manner when a force is exerted on the free end of the support arm by the clamping means said centering means precisely centering the information disc.

2. A disc centering device as recited in claim 1 including three support arms disposed at equal angular intervals about a center axis of the turntable.

3. A disc centering device as recited in claim 2, wherein the free end of each support arm is provided with a slanted surface adapted to contact the periphery of the central aperture of the information carrier disc on a line of contact, the line of contact substantially converging to a point on the center axis of the turntable above the centering means.

4. A disc centering device as recited in claim 3, wherein each slanted surface is a taper surface.

5. A disc centering device as recited in claim 4, wherein the free end of each support arm is formed in a frustoconical shape having the taper surface.

6. A disc centering device as recited in claim 5, wherein the turntable is provided with three through slots formed at equal angular intervals about the center axis of the turntable and wherein each of said support arms extends in the corresponding through slot and the taper surface of the free end of each of the support arms is located above the turntable.

7. A disc centering device as recited in claim 6, wherein the through slots pass through the cylindrical wall to thereby separate the cylindrical wall into three segments.

8. A disc centering device as recited in claim 3, wherein each slanted surface is a taper surface.

9. A disc centering device as recited in claim 8, wherein an upper periphery of the taper surface of the frustoconical shape of the free end of each support arm is positioned within an imaginary circle on which outer peripheries of the cylindrical wall lies, and an outermost portion of a lower periphery of the taper surface of the frustoconical shape of the fee end of each support arm is positioned outside the imaginary circle.

10. A disc centering device as recited in claim 9, wherein said centering means is formed in one piece of molded plastics together with the turntable.

11. A disc centering device as recited in claim 10, wherein said turntable is rotated by a drive motor, a spindle of the drive motor being fixed to the turntable to drive the turntable.

12. A disc centering device for centering an information carrier disc, having a central aperture, in a disc player, comprising:

(a) a turntable having a cylindrical wall provided at the center portion thereof, for guiding the information carrier disc to fit therearound and a disc rest portion formed around the cylindrical wall for supporting the information carrier disc;

(b) clamping means for clamping the information carrier disc in cooperation with the disc rest portion of the turntable, the clamping means being movable against the turntable between a released position and a clamping position where the information carrier disc is clamped between the clamping means and the disc rest portion; and (c) centering means for centering the information carrier disc with respect to the turntable by contacting the periphery of the central aperture of the information carrier disc when the information carrier disc is clamped by the clamping means, the centering means having three support arms disposed with equal angular intervals about a center axis of the turntable, each support arm being supported at one end thereof by the turntable to radially extend in a cantilever fashion and having a slanted surface at a free end thereof located in the vicinity of the cylindrical wall of the turntable, the slanted surfaces of the free ends of the support arms being adapted to contact the periphery of the central aperture of the information carrier disc on lines of contact substantially converging to a point on the center axis of the turntable above the centering means; each support arm being deflectable in a resilient manner when a force is exerted on the free end of the support arm in the clamping of the information carrier disc.

* * * * *